(12) United States Patent
Ohtsu et al.

(10) Patent No.: US 6,761,396 B2
(45) Date of Patent: Jul. 13, 2004

(54) SUNROOF APPARATUS

(75) Inventors: Masanobu Ohtsu, Kanagawa-ken (JP); Masaki Omori, Kanagawa-ken (JP)

(73) Assignee: Ohi Seisakusho Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/012,810

(22) Filed: Nov. 13, 2001

(65) Prior Publication Data

US 2002/0063447 A1 May 30, 2002

(30) Foreign Application Priority Data

Nov. 24, 2000 (JP) .................................... P2000-358048

(51) Int. Cl.$^7$ ................................................ B60J 7/05
(52) U.S. Cl. ...................................... 296/221; 296/223
(58) Field of Search ................. 296/216.02, 216.03, 296/221, 223

(56) References Cited

U.S. PATENT DOCUMENTS 5,527,085 A * 6/1996 Ochiai et al. ............... 298/223
6,290,289 B1 * 9/2001 Ohtsu et al. ................ 296/221
6,428,091 B2 * 8/2002 Ito et al. ..................... 296/221

FOREIGN PATENT DOCUMENTS

| DE | 3728008 | * 3/1989 | ............... 296/223 |
| DE | 4020351 | 1/1992 | |
| JP | 275422 | * 5/1987 | ............... 296/223 |

* cited by examiner

Primary Examiner—Dennis H. Pedder
(74) Attorney, Agent, or Firm—Brenda O. Holmes; Kilpatrick Stockton LLP

(57) ABSTRACT

In a sunroof apparatus provided with a lid (3) capable of opening and closing an opening formed in a roof (1) of a vehicle body, and a slider (8) longitudinally moving on a side rail (5) connected to the lid (3) and provided in a side of the vehicle body, in which a longitudinal movement of the slider (8) is automatically obtained by an actuator and a dummy full-close position temporarily closing an opening (2) by the lid exists between a tilt-up position and a flap position, the lid is made incapable of stopping at the dummy full-close position at a time of moving in an opening direction and a closing direction.

9 Claims, 8 Drawing Sheets

SUNROOF APPARATUS

BACKGROUND OF THE INVENTION

1. Field of the Invention

The present invention relates to a sunroof apparatus, and more particularly to a sunroof apparatus in which a dummy full-close position exists within a range of longitudinal movement of a lid.

2. Description of the Related Art

A sunroof apparatus of a motor vehicle is structured such that a longitudinally moving lid is provided in an opening formed in a roof and the opening is opened and closed by the lid (refer to Japanese Utility Model Publication Laid-Open No. H8-5852 as a related art). As aspects during the longitudinal movement of the lid, there are a full-close position at which the lid closes the opening, a full-open position at which the lid is received within a roof at the rear of the opening so as to be in a state of leaving the opening open, and a tilt-up position at which a rear end of the lid is lifted up in comparison with the opening. Conventionally, the full-close position exists in a center of the longitudinal moving range of a slider controlling the lid, and the structure is made such that the slider moves to a front side so as to achieve the tilt-up position, and moves to a rear side so as to achieve the full-open position.

However, in the related art as mentioned above, for the purpose of securing a watertightness and preventing a wind noise, the full-close position of the lid in which a severest position holding in a longitudinal direction is required has been set to a center in a longitudinally moving range of the lid. Accordingly, it is hard to obtain a stable state of the lid, and a high accuracy and a high rigidity are required for keeping the position of the lid. That is, since the center position in the longitudinally moving range of the lid is an unstable position capable of moving to both of a front side and a rear side, a position holding mechanism in both directions is required, so that a high accuracy and a high rigidity are required to be provided, and a structure becomes complex.

Then, there can be considered a novel structure in which the full-close position is changed to a front end in the longitudinally moving range of the lid, the tilt-up position is disposed in the center and the full-open position is disposed at a rear end. When making the structure in the manner mentioned above, it is possible to obtain a stable position holding state in the longitudinal direction of the lid only by bringing the lid into contact with the front end of the opening.

However, according to the novel structure mentioned above, the lid becomes at a flap position at which the rear end is descended rather than the opening immediately before becoming at the full-open position, and thereafter slides rearward so as to become at the full-open position, however, a dummy full-close position at which the opening for the sunroof is temporarily closed by the lid exists between the flap position and the tilt-up position.

An auto switch controlling an opening and closing operation of the lid is structured such that the full-close position, the tilt-up position and the full-open position are sequentially obtained by every pressing operation. However, the structure is made such that when again pressing the auto switch during the moving operation of the lid, the lid stops at this position. Accordingly, there is a risk that a passenger erroneously recognizes the dummy full-close position as an inherent full-close position and presses the switch so as to stop the lid.

SUMMARY OF THE INVENTION

The present invention has been achieved by taking the condition into consideration, and an object of the present invention is to provide a sunroof apparatus which can prevent a lid from being erroneously operated to stop due to an erroneous recognition.

According to a first aspect of the present invention, there is provided a sunroof apparatus comprising: a lid capable of opening and closing an opening formed in a roof of a vehicle body; a slider longitudinally moving on a side rail connected to the lid and provided in a side of the vehicle body; a full-close position at which the lid closes the opening at the forefront position of the slider moving forward; a tilt-up position at which a rear end of the lid is ascended rather than the opening at an initial stage of a backward movement of the slider; a flap position at which the rear end of the lid is descended rather than the opening by further moving the slider rearward; a full-open position at which the lid completely opens the opening by further moving the slider rearward via the flap position; the lid being moved between the respective positions; the longitudinal movement of the slider being automatically obtained by an actuator; and a dummy full-close position existing between the tilt-up position and the flap position and at which the opening is temporarily closed by the lid, wherein the lid is made incapable of stopping at the dummy full-close position at a time of moving in an opening direction and a closing direction.

According to the invention as described in the first aspect, since the structure is made such that the lid can not stop at the dummy full-close position at a time of moving in the opening direction and the closing direction, there is no risk that the passenger erroneously stops the lid at the dummy full-close position. In an automatic type switch in which the lid moves to a predetermined position on the basis of an one-touch control, the lid does not stop at the dummy full-close position but passes therethrough. If it is intended to again press the switch at the dummy full-close position so as to forcibly stop the lid, a switch control at the dummy full-close position is cancelled.

Further, an actuator can detect a position of the lid on the basis of a count number from a reference point, and the structure is made such that the lid can not be stopped at the dummy full-close position. According to this invention, since the actuator can detect the position of the lid on the basis of the count number from the reference point, it is possible to accurately recognize the dummy full-close position of the lid, and it is possible to securely cancel the switching operation at that position.

Further, according to the present invention, the lid stops at the tilt-up position at a time of moving in the opening direction and does not stop the tilt-up position at a time of moving in a reverse closing direction. Accordingly, the structure is made such as to stop at the tilt-up position at a time of moving in the opening direction and to move to the full-close position without stopping at the tilt-up position in the reverse closing direction, in the case that the passenger applies a switch control for the purpose of going to close the lid, the passenger does not move apart from the vehicle with erroneously leaving the lid at the tilt-up position.

DETAILED DESCRIPTION OF THE PREFERRED EMBODIMENT

Figure 1:
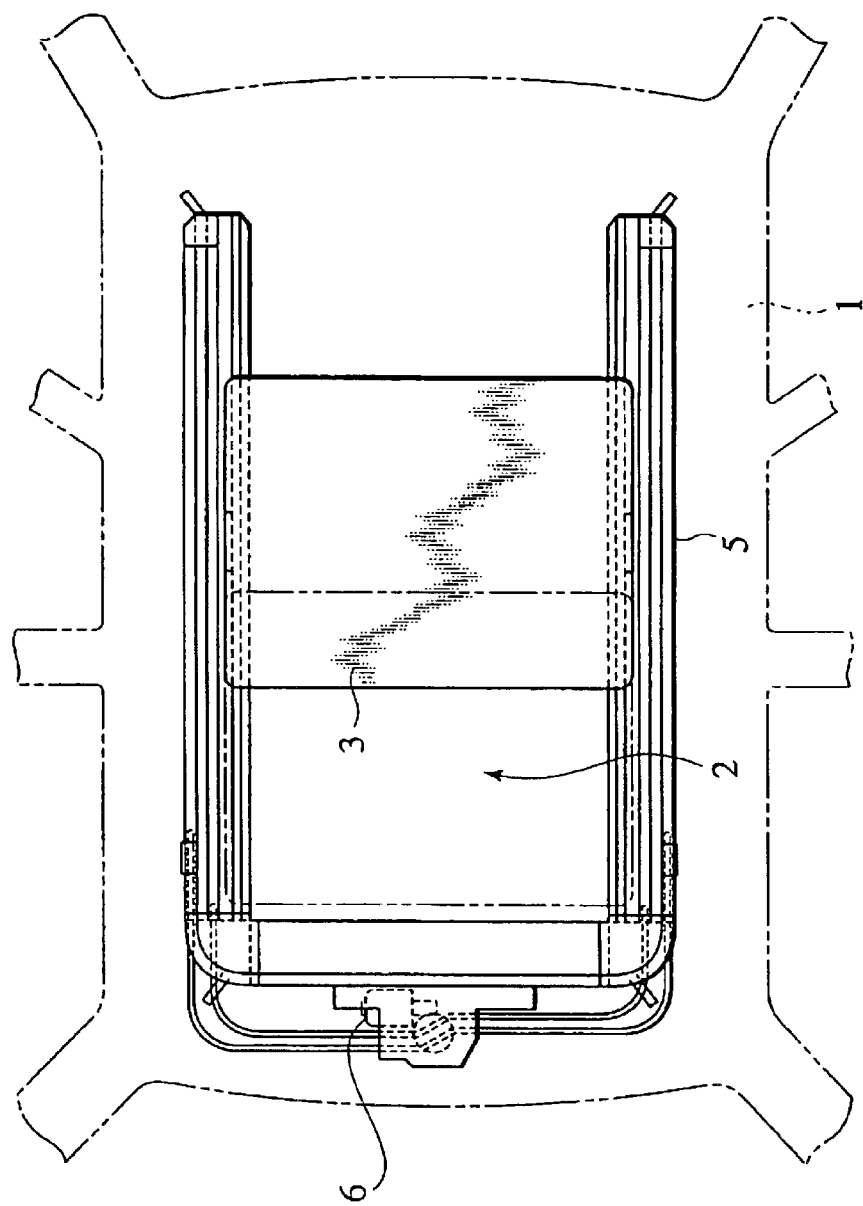
FIG. 1 is a plan view of a sunroof apparatus according to an embodiment of the present invention.
Figure 2:
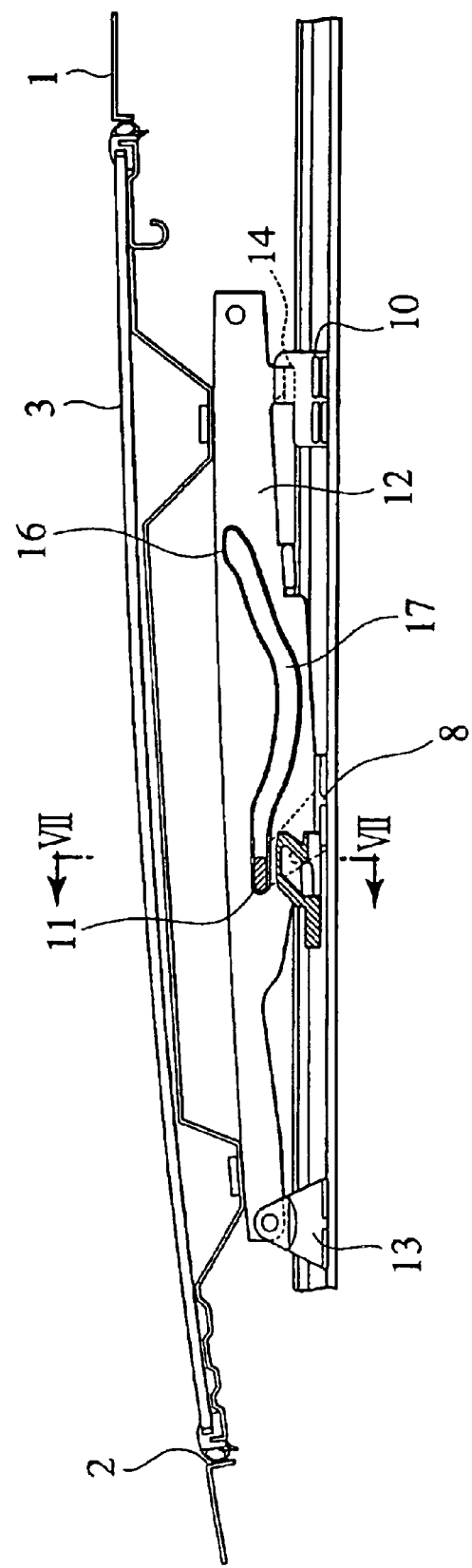
FIG. 2 is a schematic cross sectional view showing a state that a lid in FIG. 1 is at a full-close position.

A description will be given below of a preferable embodiment according to the present invention with reference to FIGS. 1 to 8. FIGS. 2 to 6 show a part of each of elements in a transparent manner for convenience of description.

An opening 2 for a sunroof is formed in a roof 1 of a motor vehicle. A lid 3 is structured such as to freely move in a longitudinal direction and open and close the opening 2. Side rails 5 made of an extrusion molded product and formed in a symmetrical manner are respectively arranged in both right and left sides of the opening 2 and in a lower side of the roof 1. A motor 6 corresponding to an "actuator" is provided in a front portion of the opening 2. The motor 6 can detect a position of the lid 3 according to a count number obtained by setting a full-close position mentioned below of the lid 3 to a reference point. Cables 7 (FIG. 7) are arranged within the respective side rails 5 in both right and left sides from the motor 6. The cables 7 are engaged with a gear of the motor 6 and are structured such that the right and left cables 7 can simultaneously move in a longitudinal direction in response to a rotation of the motor 6.

A slider 8 and a hook member 10 longitudinally moving together with the cable 7 in a state of being connected to the cable 7 and the slider 8 and the hook member 10 are provided in the side rail 5. A guide pin 11 is provided in an upper end of the slider 8.

On the contrary, guide members 12 along the longitudinal direction are fixed to lower surfaces of both right and left ends of the lid 3, and are structured such as to longitudinally move integrally with the lid 3. Each of the guide members 12 is structured such that a rear side thereof freely rotates vertically around a front leg portion (a front end portion) 13 engaged within the side rail 5 in a longitudinally slidable manner, and a rear leg portion 14 is structured such as to freely engage with and disengage from the hook member 10 from a front side.

A resin cap member 16 is fitted to a center portion of the guide member 12. A substantially V-shaped guide groove 17 as seen from a side portion (in a state shown in FIG. 2) is recessed in the cap member 16 in a nonpenetrating state. The guide pin 11 formed in an upper end of the slider 8 is movably engaged with the guide groove 17. When forming the guide groove 17 in the resin cap member 16 in the manner mentioned above, a working process can be easily executed in comparison with the case of directly forming it in the metal guide member 12. Further, since the guide pin 11 is in contact with the resin, a sliding resistance is reduced and the guide pin 11 can be smoothly moved. Further, since the guide groove 17 of the cap member 16 is formed in a nonpenetrating shape, a rigidity of the cap member 16 is not reduced.

Figure 3:
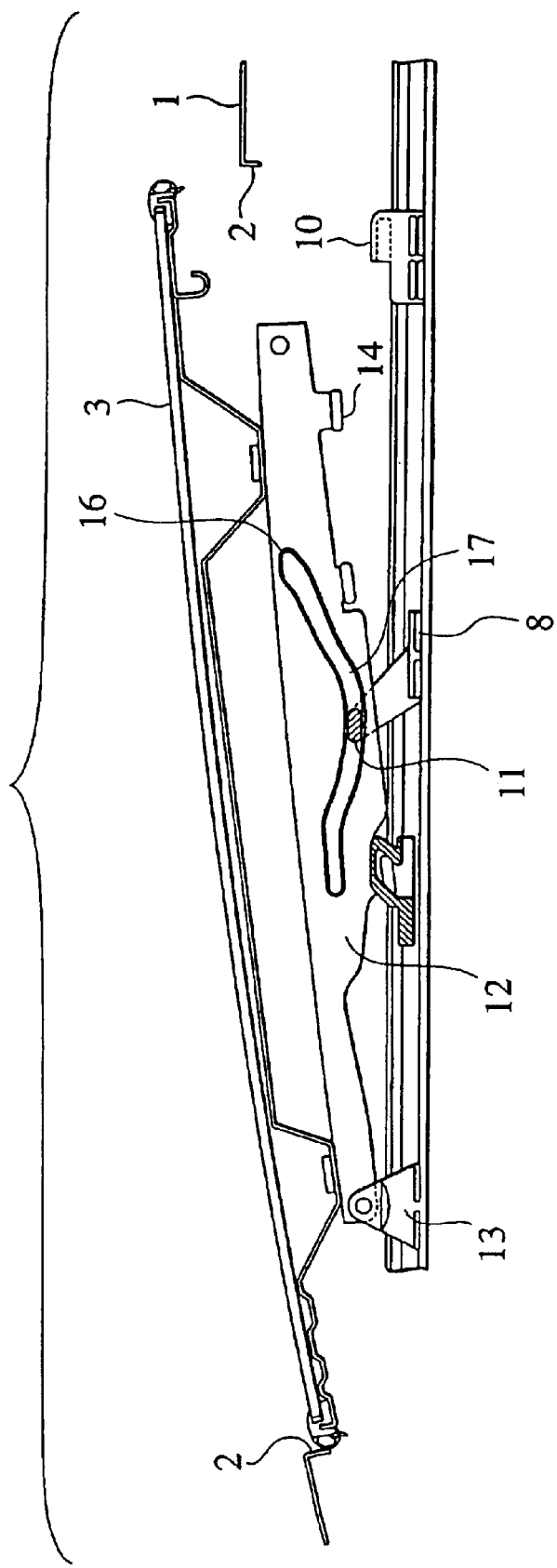
FIG. 3 is a schematic cross sectional view showing a state that a lid in FIG. 1 is at a tilt-up position.

Next, a description will be given of an actual moving way of the lid 3 with reference to FIGS. 2 to 6. At first, when transmitting a drive force of the motor 6 to the slider 8 via the cable 7 so as to move backward the slider 8, from a full-close state (FIG. 2), the guide pin 11 of the slider 8 reaches a middle portion from a front end portion of the guide groove 17, and the lid 3 becomes at a tilt-up position (FIG. 3). At this time, the rear leg portion 14 is moved apart from the hook member 10 together with the movement of the slider 8.

Figure 4:
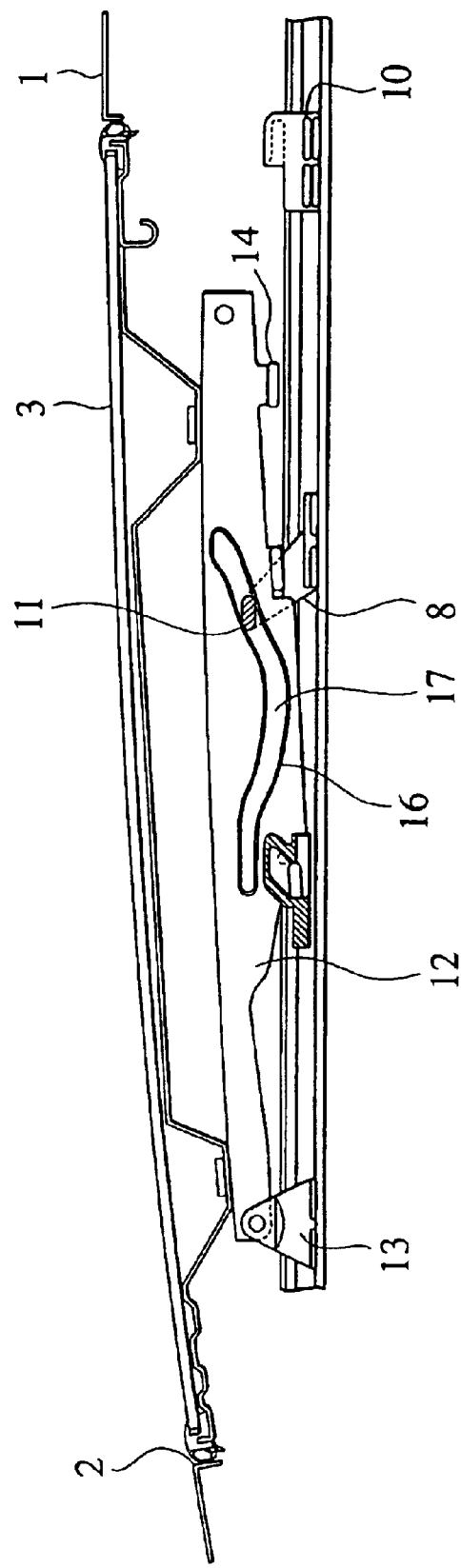
FIG. 4 is a schematic cross sectional view showing a state that a lid in FIG. 1 is at a dummy full-close position.
Figure 5:
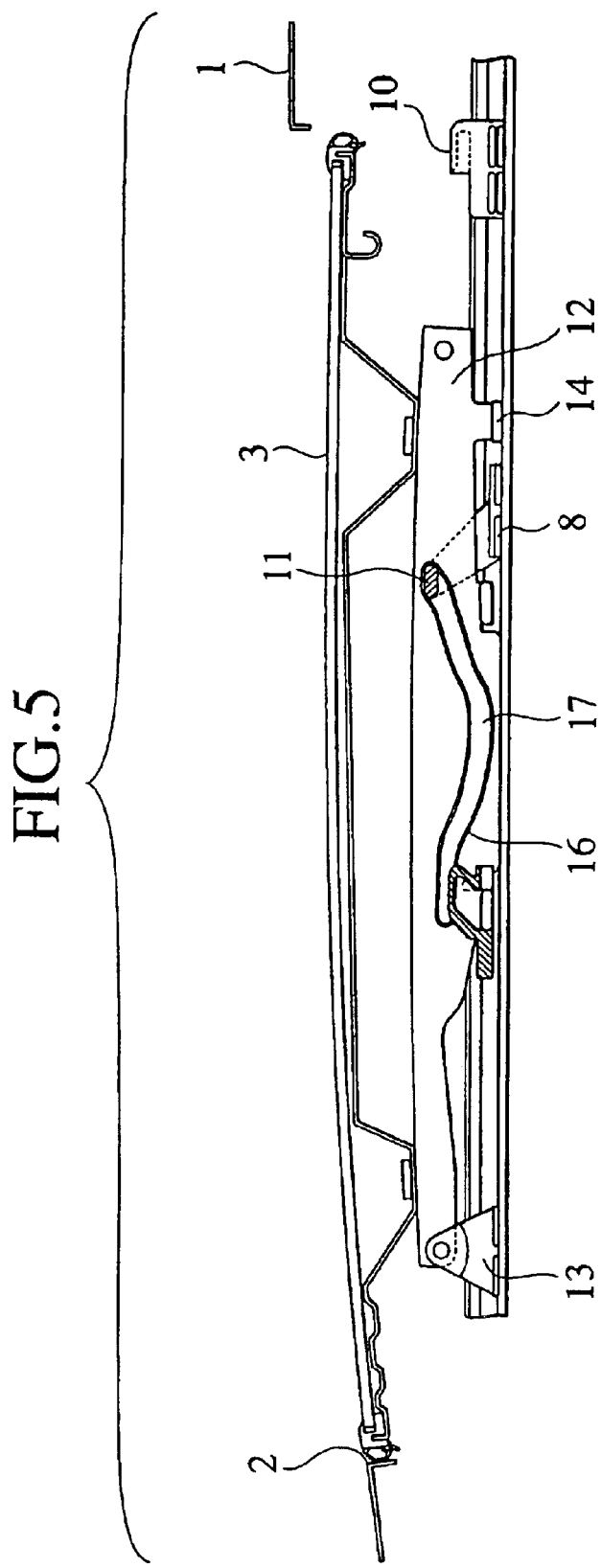
FIG. 5 is a schematic cross sectional view showing a state that a lid in FIG. 1 is at a flap position.

Next, when further moving the slider 8 backward, the lid 3 passes through a dummy full-close position (FIG. 4) at which the lid 3 instantaneously closes the opening 2 without stopping the dummy full-close position, thereafter the guide pin 11 is brought into contact with the rear end portion of the guide groove 17, and the lid 3 becomes at a flap position at which a rear end of the lid 3 is descended from the opening 2 (FIG. 5).

Figure 6:
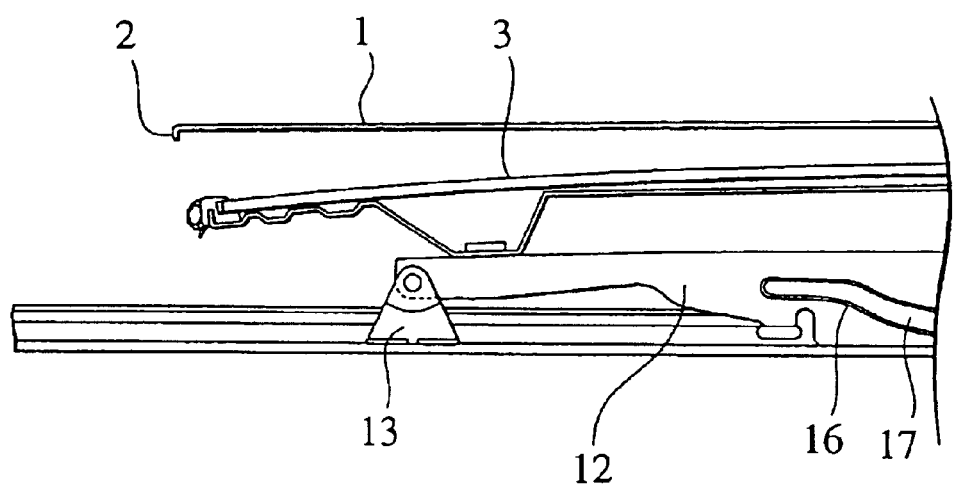
FIG. 6 is a schematic cross sectional view showing a state that a lid in FIG. 1 is at a full-open position.
Figure 7:
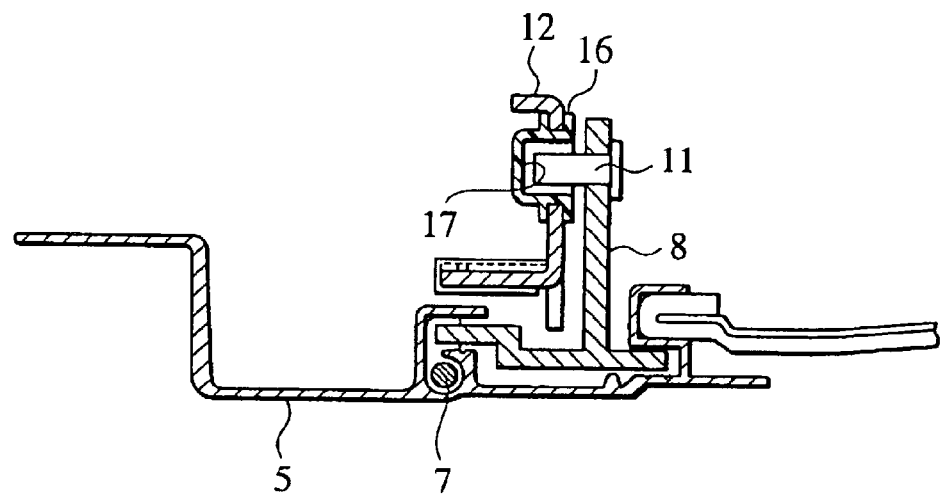
FIG. 7 is a cross sectional view along a line VII–VII in FIG. 2.

When further moving the slider 8 backward while engaging the guide pin 11 with the rear end portion of the guide groove 17, the lid 3 becomes a full-open state at which the opening 2 is completely opened (FIG. 6).

Further, when moving the slider 8 in a closing direction, the lid 3 moves in the reverse order to that mentioned above, and returns to the full-close position.

Figure 8:
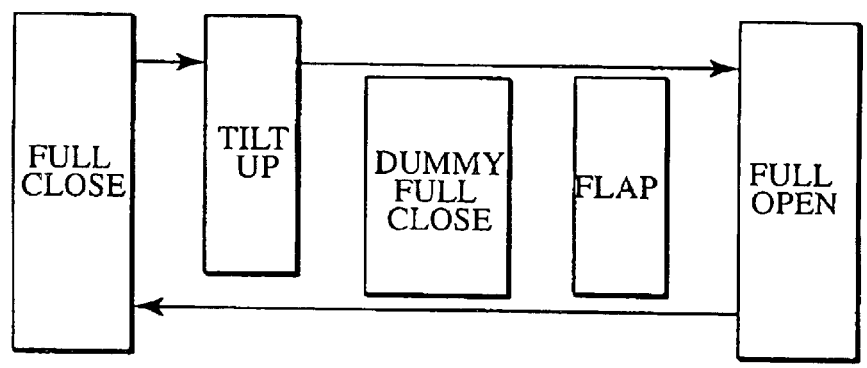
FIG. 8 is a schematic view showing a state during a longitudinal movement of the lid in FIG. 1.

In each of the states mentioned above, the positions automatically obtained by a switching control are constituted by three positions comprising the full-close position, the tilt-up position and the full-open position in the opening direction, as shown in FIG. 8, and in the closing direction, the tilt-up position is omitted and the position is returned to the full-close position from the full-open position at a breath.

Figure 9:
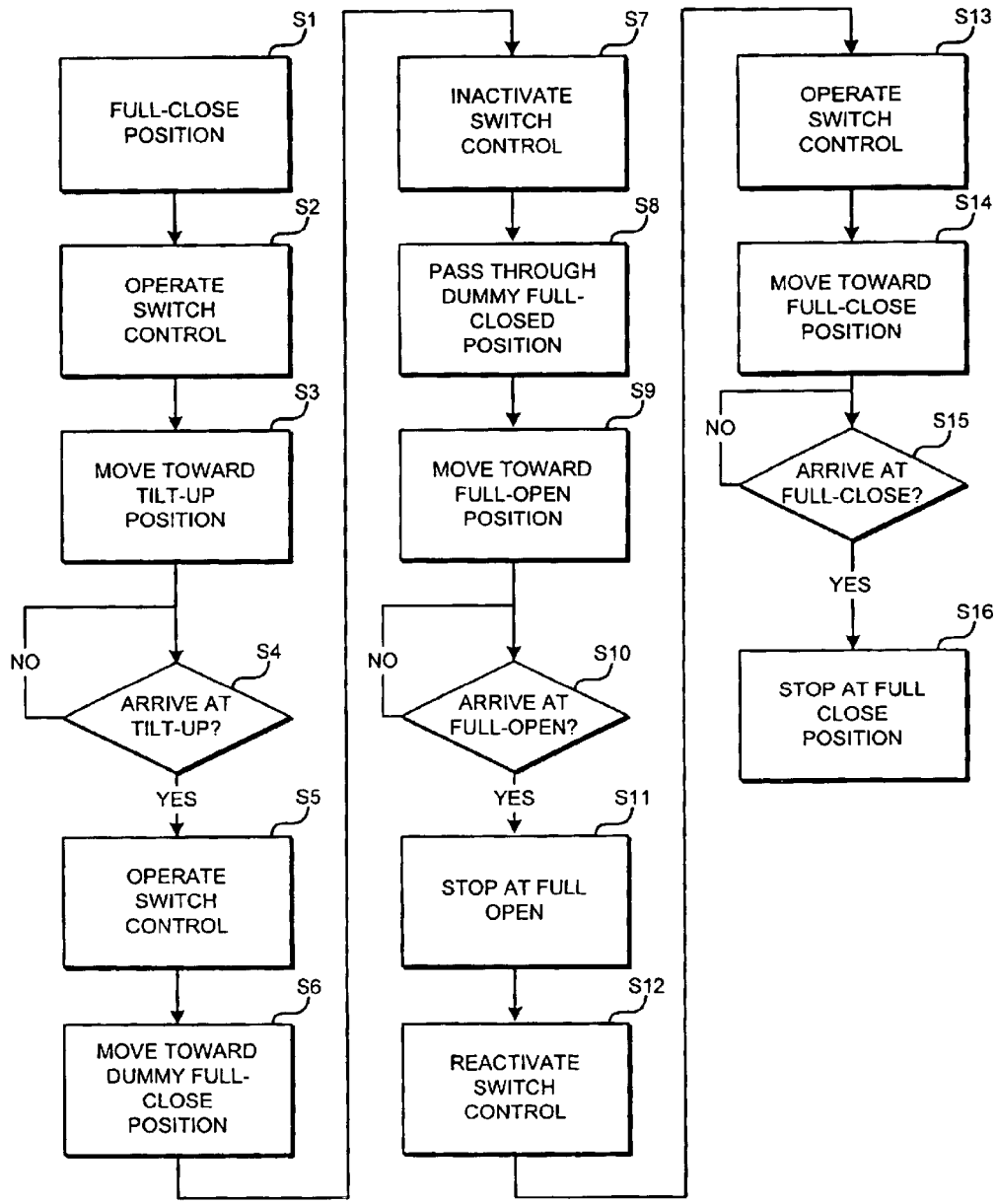
FIG. 9 is a flow chart showing the movement of a lid and the operation of a switch control.

FIG. 9 is a flow chart explaining the movement of the lid and the operation of the switch control. A driver of a motor vehicle operates a switch when the lid 3 is in the full-close position in order to move the lid 3 to the tilt-up-position (Steps 1 and 2). Upon the operation of the switch, the motor 6 is actuated to move the lid 3 toward the tilt-up position (Step 3). When it is detected that the lid 3 has arrived at the tilt-up position as shown in FIG. 3, the motor 6 is automatically stopped at the tilt-up position (Step 4).

The driver then operates the switch in order to move the lid 3 from the tilt-up position to the full-open position (Step 5). Upon the operation of the switch, the motor 6 is actuated to move the lid 3 toward the dummy full-close position (Step 6). At this point, the switch to control the motor 6 is inactivated (Step 7) so that even if the driver intends to forcibly stop the lid 3 by again pressing the switch at the dummy full-close position, such a switch control is cancelled. The lid 3 continues to move toward the full-open position, passing through the dummy full-close position as shown in FIG. 4 and through the flap position as shown in FIG. 5 (Steps 8 and 9). When it is detected that the lid 3 has arrived at the full-open position as shown in FIG. 6, the motor 6 is automatically stopped at the full-open position (Steps 10 and 11). Once the lid 3 has arrived at the full-open position, the switch to control the motor 6 is reactivated (Step 12).

The driver then operates the switch in order to move the lid 3 from the full-open position to the full-close position (Step 13). Upon the operation of the switch, the motor 6 is actuated to move the lid 3 toward the full-close position (Step 14). When it is detected that the lid 3 has arrived at the full-close position as shown in FIG. 1, the motor 6 is automatically stopped at the full-close position (Steps 15 and 16).

That is, at a time of moving the lid 3 in the closing direction, the structure is made such that the lid can not be stopped at the dummy full-close position. According to the embodiment, there is employed the automatic type switch by which the lid 3 automatically moves to the predetermined position on the basis of the one-touch control, however, the lid 3 always passes through the dummy full-close position without stopping the dummy full-close position. If it is intended to forcibly stop the lid at the dummy full-close position by again pressing the switch at the dummy full-close position, the switch control at the dummy full-close position is cancelled. According to the structure mentioned above, there is no risk that the passenger erroneously stop the lid 3 at the dummy full-close position.

In this case, since the structure is made such that the lid 3 stops at the tilt-up position at a time of moving in the opening direction, however, does not stop even at the tilt-up position in the reverse closing direction, in the case that the passenger executes the switch control so as to intend to close the lid 3, the passenger does not move apart from the vehicle while leaving the lid 3 at the tilt-up position due to the erroneous recognition.

What is claimed is:

1. A sunroof apparatus for a roof provided on a vehicle body and having an opening, the apparatus comprising:
    a side rail provided in a side of the opening;
    a slider having a guide pin longitudinally moving on the side rail;
    a hook longitudinally moving on the slide rail;
    an actuator operative to move the slider and the hook;
    a lid opening and closing the opening of the vehicle body;
    guide members provided with the lid and each guide member having a guide groove, the guide pin of the slider being movably engaged with one of the guide grooves;
    a first leg portion provided at a front end of each guide member and movably engaged with the side rail; and
    a second leg portion provided at a rear end of each guide member and freely engaged with and disengaged from the hook of the side rail;
    wherein when the actuator is operated to move the lid from a full-close position where the opening is closed by the lid to a tilt-up position where a rear end of the lid is ascended relative to the opening, the slider moves from a forefront position to a first intermediate position within the guide groove and the second leg portion disengages from the hook of the slider rail;
    wherein when the actuator is operated to move the lid from the tilt-up position to a full-open position where the opening is substantially opened, the slider moves to a rear end portion of the guide groove;
    wherein when the lid moves from the tilt-up position to the full-open position, the lid passes through a dummy full-close position where the opening is temporarily closed by the lid and the slider moves through a second intermediate position; and
    wherein the actuator is connected to a switch controlling the actuator, and the actuator detects a position of the lid, and wherein when the lid is located at the dummy full-close position, the switch is disconnected from the actuator and the lid is made capable of stopping at the dummy full-close position.

2. A sunroof apparatus according to claim 1, wherein the actuator is capable of detecting a position of the lid on the basis of a count number from a reference point.

3. A sunroof apparatus according to claim 1, wherein the actuator is operative to stop the lid at the tilt-up position at a time of moving in the opening direction and is not operative to stop at the tilt-up position at a time of moving in a reverse closing direction.

4. A sunroof apparatus according to claim 1, wherein the guide members along a longitudinal direction are fixed to lower surfaces of both right and left ends of the lid, and the guide members longitudinally move together with the lid.

5. A sunroof apparatus according to claim 4, wherein each guide member is structured such that a rear side freely rotates vertically around the first leg portion, and the second leg portion is freely engaged with and disengaged from the hook provided in the side rail.

6. A sunroof apparatus according to claim 4, wherein resin cap members having a longitudinal extent are fitted to center portions of the guide members, and substantially V-shaped guide grooves are provided in the longitudinal extent of the cap members.

7. A sunroof apparatus according to claim 6, wherein the guide pins formed in an upper end of the slider is movably engaged with one of the guide grooves.

8. A sunroof apparatus according to claim 6, wherein the guide grooves comprise recess portions which do not penetrate through the cap members.

9. The sunroof apparatus according to claim 1, wherein when the lid moves from the tilt-up position to full-open position, the lid passes through the dummy full-close position and a flap position where the rear end of the lid is descended relative to the opening and the slider moves to the rear end portion of the guide groove.

\* \* \* \* \*